Feb. 20, 1951      J. K. SPRAGUE      2,542,719
CLAMP FOR MAKING MICA CONDENSERS
Filed Oct. 19, 1944
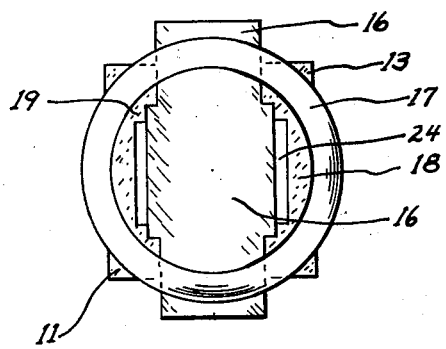
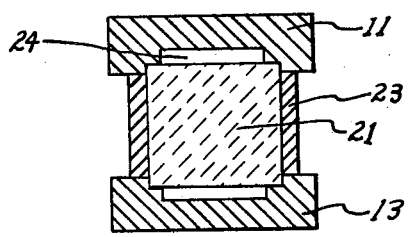
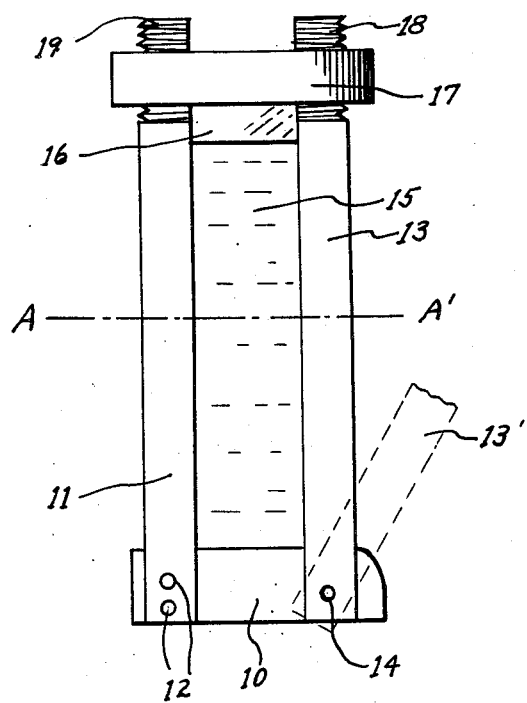
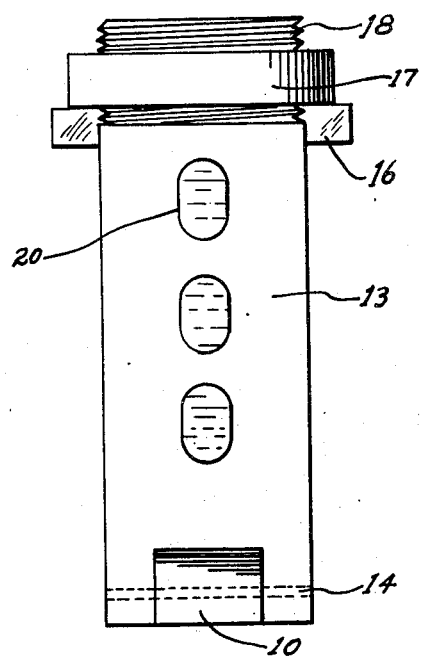
JULIAN K. SPRAGUE
INVENTOR
BY Arthur T. Connolly
ATTORNEY Patented Feb. 20, 1951

2,542,719

UNITED STATES PATENT OFFICE 2,542,719

CLAMP FOR MAKING MICA CONDENSERS

Julian K. Sprague, North Adams, Mass., assignor to Sprague Electric Company, North Adams, Mass., a corporation of Massachusetts Application October 19, 1944, Serial No. 559,458

2 Claims. (Cl. 91—60)

This invention relates to improved condenser clamps and more particularly refers to an improved type of assembly for clamping stacked mica condensers prior to the application of varnish or other impregnation.

One procedure followed in the manufacture of stacked mica condensers involves the following general steps: (a) stacking of mica and foil, (b) clamping the stacked sections tightly, (c) impregnating the stacked clamped section with varnish, shellac or other moisture resistant resinous material, (d) soldering terminals to the lead foils, and (e) molding or assembling the individual section into a container. The second general step, that of clamping a plurality of sections together for impregnation, is a very critical one. It permits the sections to be tightly held for maximum capacity, since following the impregnation and curing of the varnish, the sections will retain the shape (or thickness) to which they are set during the clamping process. Variations in this pressure cause non-uniform condensers to be produced. By use of a predetermined clamping pressure on the stacked sections, the same capacity values may be repeatedly achieved from day to day.

It might be added that an alternate process sometimes used involves impregnating with varnish before clamping. Following impregnation, the units are clamped as described above, to squeeze out the excess varnish, and the clamped sections are then cured as usual.

The clamping device used for the stacked mica sections should possess, therefore, the following properties:

1. Ease of loading and unloading.
2. Large useful volume (e. g. the number of sections clamped should be as large as possible for the physical dimensions of the clamp).
3. Means for maintaining a known and repeatable pressure on the stacked section.
4. Simple adjustment and minimum of individual components.

Prior to the present invention, no condenser clamp possessed the foregoing properties.

Mica clamps heretofore used generally comprised a base plate with four threaded bolts extended therefrom for several inches parallel to each other, and a top plate with holes therein corresponding to and permitting passage of the bolts therethrough. The mica sections were slid in the top of the clamp, fitting within the area defined by the bolts. When stacking was completed the top plate was placed on the uppermost mica section, and four nuts were placed on the bolts and tightened onto the top plate by means of a wrench. Pressure was applied to the top plate from a vertical position and the nuts tightened down on the top plate to retain the pressure. Following impregnation and curing, the nuts were removed and the top plate lifted off. The impregnated units were then lifted from the clamp or pushed out by means of pressure applied thereto through a hole in the base plate. Due to the fact that the varnish tended to hold the sections to the bolts, this was often a tedious operation and sometimes resulted in warped or broken sections. Further, both the time of loading and unloading the section was inordinately long. It was very difficult to adjust the four nuts on the bolts to maintain the pressure equally distributed over the flat plane of the mica sections. Often one bolt would be tighter than the others and hence the corner of the sections nearest to this bolt would bear a high pressure, while the other three corners of the sections would bear lower pressures.

It is an object of this invention to overcome the foregoing disadvantages and others which directly or indirectly result therefrom. A further object is to produce a new and surprisingly efficient clamp for stacked mica condensers. A still further object is to produce a new type of clamp for stacked mica condensers, in which clamping pressure is maintained uniform by new and inexpensive means. Additional objects will become apparent from a consideration of the following description and claims.

These objects are attained in accordance with the present invention which concerns a clamp for stacked mica condensers which clamp comprises a base plate, a supporting arm fixedly attached thereto and a supporting arm movably attached thereto, said movable arm being parallel to said fixed arm, and a coupling ring attached to both of said supporting arms at their upper extremities. In a more restricted sense, this invention is concerned with a clamp for stacked mica condensers which comprises a supporting base, two grooved supporting arms attached to said base and extending vertically therefrom in parallel, the inside of the grooved portions facing inwardly, one of said arms being capable of at least partial rotation about said supporting base on a pinion attaching said arm to said base, and a coupling ring threaded about the upper extremities of both supporting arms. In a still more restricted sense this invention is concerned with a mica condenser clamp, comprising a supporting base, a channelled fixed supporting arm mounted thereon, a channelled movable supporting arm mounted thereon by means of a single pin, the inner sections of said channeled arms being adapted to receive mica condenser sections, and a coupling ring threaded on the upper outer extremities of both said supporting arms, said coupling ring exerting pressure on a pressure plate located within the inner boundaries of the supporting arms, to maintain uniformly distributed pressure on the stacked sections thereunder.

According to one of the preferred embodiments of this invention, the clamp fundamentally consists of but five integral parts. The first component is the base to which is firmly attached the second component, a supporting arm channelled on its inner face to receive mica sections. Parallel to this arm is another supporting arm, the third component, likewise grooved or channelled, so that when the arms are in a parallel position, the grooves or channelling corresponds to the lateral and longitudinal dimensions of the mica condensers, so that the latter will be snugly accommodated. However, since one of the arms is movable about the base, during the loading and unloading operation, the movable arm may be readily moved to permit rapid and efficient insertion or removal of the mica sections from the grooved arms.

The fourth integral component of this clamp is a cylindrical coupling ring, threaded along its inner surface. This coupling ring may be inter-threaded or turned on to the upper extremities of the grooved arms, which, of course, must be correspondingly threaded on their outer surfaces. The coupling ring bears upon a pressure plate, the fifth component, with pressure equally distributed over the contact area, the contact area being in a plane perpendicular to the vertical axis of the stacked units and clamp. Thus, the usual four-nut assembly may be replaced by a simple, unitary, pressure-equalizing member.

According to another preferred embodiment, the channelled arms are so constructed as to permit ready insertion of a tool which pushes the sections away from the supporting arms, thus freeing them for ready removal. This embodiment involves the use of a deeper recess or groove in part of the channelled portion of the arms, said groove being adapted to receive a tool on which pressure may be applied to pry the sections from the channeled portion of the supporting arms.

The invention will be further described with reference to the appended drawings, in which Figure 1 represents a side view of a clamp constructed in accordance with this invention;

Figure 2 represents a top view of the clamp shown in Fig. 1;

Figure 3 represents a front view of the clamp shown in Fig. 1; and

Figure 4 represents a cross-sectional view of the clamp of Fig. 1, the cross-section being taken along the line A—A'.

Referring more specifically to Figure 1, 10 is a metal base plate, to which are affixed supporting arms 11 and 13. Supporting arm 11 is attached to base plate 10 by means of bolts, studs, pins or other locking devices 12, there being generally two to insure the permanent positioning of the supporting arm in a plane perpendicular to the plane of the base plate 10. It is also possible to make base plate 10 and supporting arm 11 of one piece of metal, but for the sake of simplicity of manufacture and machining, the elements are usually of two individual pieces of metal. Supporting arm 13 is affixed to base plate 10 by a single pinion 14, so that the arm may be rotated. 15 represents the mica sections stacked in the clamp between the base plate 10 and the pressure plate 16. Coupling ring 17 is threaded about threaded portions 19 and 18 of supporting arms 11 and 13, respectively, and bears on pressure plate 16.

Shown in dotted lines is 13' which represents supporting arm 13 rotated around pinion 14, away from supporting arm 11, for loading or unloading the clamp. (It is obvious that when the movable supporting arm assumes the position indicated as 13', the coupling ring will not be attached to the threaded portions 18 and 19.)

Referring now to Figure 2, a top view of the clamp described in Figure 1 is shown. The corners of supporting arms 11 and 13 appear, as well as the upper threaded portions 19 and 18 of these supporting arms, respectively. The channelling of the inner faces of the supporting arm may be noted. Coupling ring 17 is shown, threaded about 19 and 18 and bearing on pressure plate 16, which is fitted into the channelled portions of the supporting arms 11 and 13 except for the inner recess of each, which is shown as 24. It is preferable that the extremities of pressure plate 16 extend beyond the outer extremities of the coupling ring 17, although, if desired, the extremities of the plate 16 may coincide with the outer extremities of the coupling ring.

Figure 3 shows a front view of the clamp in which the supporting arm 13 faces the observer. Arm 13 is shown as mounted on base plate 10 by means of pinion 14, which may extend all the way through. Holes in the supporting arm are indicated by 20. The use of holes in the supporting arm is optional although they help to facilitate the impregnation process. The number and size of the holes depends largely upon the strength of the resulting arm, size of the clamp, etc. The fixed supporting arm 11 (not shown in Figure 3) is likewise provided with holes. Pressure plate 16 can be seen, extending beyond the edges of the supporting arm 13 and the coupling ring 17. Coupling ring 17 is threaded about threaded portion 18 of supporting arm 13 and bears directly upon pressure plate 16, which in turn bears on the mica sections within the clamp.

It will be obvious that equally distributed pressure will be exerted on the mica sections if the following conditions exist: First, the upper and lower surfaces of plate 16 are parallel. Second, the threading 18 and 19 on arms 13 and 11, respectively, and on the coupling ring 17 is standard, so that the bottom face of coupling ring 17 is parallel with the upper surface of the base plate 10.

The cross-section through A—A' of Fig. 1 is shown in Fig. 4. 11 represents the fixed supporting arm and 13 represents the movable supporting arm. A mica condenser section is shown as comprising mica sheets 21 and lead foil 23. The lead foil 23 extends outwards between the two supporting arms while mica sheet 21 is fitted into the first or outer grooving step, and is held there by the rectangle defined by the total of four corners provided by the grooving. Inner grooving step 24 is free, permitting passage of impregnant during the impregnation, and after baking permitting insertion of a similarly dimensioned tool which may then be used to pry out the sections by pressure applied towards the other supporting arm.

The use of the aforesaid clamp generally proceeds as follows: the clamp is opened, to a position similar to that indicated in 13' of Figure 1, and the mica sections separated by lead foil are piled vertically on the base plate. The pressure plate is then placed on top of these sections, supporting arm 13 is closed, and coupling ring 17 is threaded on sections 18 and 19. The clamp is then placed in a hydraulic press and pressure applied between the base and the pressure plate 16, by introducing a rod or bar within the open center of the coupling ring, so that the press movement will result in a downward pressure on the pressure plate, forcing the mica sections to their desired thickness. The coupling ring 17 is then turned down by hand to meet the pressure plate 16, and the hydraulic pressure on the rod or bar removed. The pressure plate 16 will, of course, remain in position due to the coupling ring 17. No wrench is needed to turn or spin the coupling ring down to meet the pressure plate, as long as the threads are reasonably clean. Following impregnation and baking of the mica sections, the coupling ring is turned off the threaded portions 18 and 19 and movable supporting arm 13 rotated about pinion 14. A long strip or rod of metal is then introduced in the inner groove 24 of the arm to which the mica sections 21 stick, and pulled away from the arm to release the sections from the supporting arm. Mica sections so treated are much less likely to be damaged by breaking, splitting, etc. than those which are forced out of the prior, four-bolt type of clamp.

The elements of the clamp may be made of any type of durable metal. Steel may be used with good results. Brass, bronze, aluminum, etc. may also be used. The arms and/or base may also be of a cast iron construction with appropriate machining of the grooves, etc. The thread of the coupling ring is dependent, of course, upon the diameter of the ring, as well as the required strength of the coupling, and ease of turning.

While the clamp described in connection with the appended drawings is one specific type, it is obvious that many other clamps, of similar design, and operating on the same fundamental principles may be produced. Also, condenser sections other than mica may be impregnated and cured in a clamp of this type. The clamp may be used generally where porous objects are to be impregnated with various materials under a known and constant clamping pressure.

It is to be understood that the metal electrode foils in the mica condenser section previously described may be of lead, copper, aluminum, tin or alloys customarily employed for this purpose. Likewise, this condenser section may be modified or constructed in any of the various manners well known to those familiar with this art.

As many apparently widely different embodiments of this invention may be made without departing from the spirit and scope hereof, it is to be understood that the invention is not limited to the specific embodiments hereof except as defined in the appended claims.

What I claim is:

1. In a clamp for securely holding stacked impregnated condensers under pressure while the condensers are being cured to harden the impregnant, a rigid base having a flat surface, a first elongated arm attached to and extending substantially perpendicularly out from said surface, a second elongated arm movably held on said base for shifting to and away from a position generally parallel to the first arm, in which position the arms have longitudinally extending portions spaced from each other to define between them a longitudinally extending clamping space for receiving the stacked condensers, a pressure plate in said space for transmitting compressing pressure to stacked condensers held against the base the outer ends of said arms beyond said pressure plate defining between them in said parallel position a longitudinally extending passageway communicating with the pressure plate for the penetration of a pressing tool to press the pressure plate toward the base; the exterior of the outer end portions of each arm being threaded to define a section of a split external thread, an internally threaded ring threadedly received on said split external thread for threaded adjustment along said parallel-positioned arms to engage the pressure plate and keep the condensers clamped down after they have been compressed by the pressing tool.

2. The combination as defined in claim 1 in which at least one arm is longitudinally grooved to present, between the clamping space and the arm, a second passageway for admitting a prying tool to assist in shifting the movable arm away from its generally parallel position after the condenser curing is completed and impregnant squeezed out from the compressed condensers has hardened in contact with the arms and cemented them together.

JULIAN K. SPRAGUE.

REFERENCES CITED

The following references are of record in the file of this patent:

UNITED STATES PATENTS

| Number | Name | Date |
|---|---|---|
| Re. 19,716 | Birkenmaier | Oct. 1, 1935 |
| 189,019 | Caler et al. | Apr. 3, 1877 |
| 1,590,590 | Seymour et al. | June 29, 1926 |
| 1,666,044 | Danziger | Apr. 10, 1928 |
| 1,726,155 | Knudsen | Aug. 27, 1929 |
| 1,823,677 | Bay | Sept. 15, 1931 |
| 2,108,957 | Blackburn | Feb. 22, 1938 |
| 2,219,846 | Meyer | Oct. 29, 1940 |